United States Patent
Ward et al.

(10) Patent No.: US 10,466,893 B2
(45) Date of Patent: Nov. 5, 2019

(54) TOUCH SCREEN PANEL WITH MULTI-AXIS MANOEUVRING OF INJECTION PRESSES FOR PLASTIC MATERIALS

(71) Applicant: NEGRI BOSSI S.P.A., Cologno Monzese (Milan) (IT)

(72) Inventors: Craig Ward, Cologno Monzese (IT); Davide Mosca, Cologno Monzese (IT)

(73) Assignee: NEGRI BOSSI S.P.A., Cologno Monzese (Milan) (IT)

( * ) Notice: Subject to any disclaimer, the term of this patent is extended or adjusted under 35 U.S.C. 154(b) by 0 days.

(21) Appl. No.: 15/782,175

(22) Filed: Oct. 12, 2017

(65) Prior Publication Data

US 2018/0107374 A1 Apr. 19, 2018

(30) Foreign Application Priority Data

Oct. 13, 2016 (IT) .......................... 102016000102910

(51) Int. Cl.
*G06F 3/0488* (2013.01)
*G06F 3/0484* (2013.01)
(Continued)

(52) U.S. Cl.
CPC .......... *G06F 3/04883* (2013.01); *B29C 45/47* (2013.01); *B29C 45/76* (2013.01);
(Continued)

(58) Field of Classification Search
CPC ............. G06F 3/04883; G06F 3/04847; G06F 3/04886; G06F 3/04817; G06F 3/04845;
(Continued)

(56) References Cited

U.S. PATENT DOCUMENTS

| 6,618,041 B2 * | 9/2003 | Nishizawa | G05B 19/409 264/40.1 |
| 2013/0050135 A1 * | 2/2013 | Stewart | G06F 3/04895 345/174 |
| 2016/0364111 A1 * | 12/2016 | Piekny | G06F 3/0488 |

FOREIGN PATENT DOCUMENTS

| DE | 10 2014 114 322 A1 | 7/2016 | |
| WO | 2012/062374 A1 | 5/2012 | |
| WO | WO-2016050390 A1 * | 4/2016 | ............. B29C 45/76 |

OTHER PUBLICATIONS

Grimm, "Description WO2016050390" (English Translation) (Year: 2016).*

(Continued)

*Primary Examiner* — John T Repsher, III
(74) *Attorney, Agent, or Firm* — Young & Thompson

(57) ABSTRACT

Touch screen operator control panel for industrial machines, in particular for the control of maneuvering of the axes of injection presses for plastics, including an operator interface on which icons are displayed indicating the various axes of a press, the icons being individually selectable in order to be dragged into an area of maneuvering where they are translatable in the two ways of a prefixed direction to impart the corresponding movements to the selected axis, wherein the possibility is provided of simultaneously displaying in the maneuvering area icons of several press axes correlated one to the other and of actuating sequentially/selectively the movements of these press axes by dragging a central zone of the maneuvering area in the corresponding different directions wherein the respective icons of the press axes are displayed.

6 Claims, 5 Drawing Sheets

(51) Int. Cl.
  *G05B 19/409* (2006.01)
  *B29C 45/47* (2006.01)
  *G06F 3/0481* (2013.01)
  *B29C 45/76* (2006.01)

(52) U.S. Cl.
  CPC ....... *G05B 19/409* (2013.01); *G06F 3/04817* (2013.01); *G06F 3/04845* (2013.01); *G06F 3/04847* (2013.01); *G06F 3/04886* (2013.01); *B29C 2045/7606* (2013.01)

(58) Field of Classification Search
  CPC ....... G05B 19/409; B29C 45/47; B29C 45/76; B29C 2045/7606
  See application file for complete search history.

(56) References Cited

OTHER PUBLICATIONS

IT Search Report, dated Aug. 9, 2017, from corresponding IT 201600102910 application.

\* cited by examiner

TOUCH SCREEN PANEL WITH MULTI-AXIS MANOEUVRING OF INJECTION PRESSES FOR PLASTIC MATERIALS

The present invention relates to an operator control panel of the touch screen type to be used on industrial machines, in particular on injection presses for plastic materials, which allows the display and control of the manoeuvring of several press axes.

BACKGROUND OF THE INVENTION

As is known, a press for the injection moulding of plastic materials comprises several axes, some of which correlated one to the other, more particularly in pairs, such as for example the mould and extractor axes and the injection and rotation of plasticisation screw axes, which have to be appropriately controlled by the operator during a work cycle of the press.

This is done with an appropriate control panel, which can be of various types, in particular touch screen, to remain within the scope of the invention.

Currently the axes manoeuvring integrated in the press control software with touch screen operator panel can be actuated by selecting the movement to be performed, for example mould axis, and dragging the movement selected along a single axis, as shown schematically in the accompanying FIG. 1. This drawing shows an elliptical area, starting from the centre of which the icon corresponding to the axis to be moved is displaced horizontally.

Again, according to the state of art, in order to control another axis, for example the extractor axis, which is correlated to the mould axis, the operator has to transport the corresponding icon to the centre of the elliptical area of FIG. 1 and drag it horizontally in the corresponding direction to perform the manoeuvring required.

It is clear that this is somewhat inconvenient and makes control of the press axes rather laborious.

DE 102014114322 A1 describes an operator control panel for injection presses, wherein multiple sliders are provided for moving the different press axes. Such a solution is not very practical and does not allow the operator to display simultaneously in a single manoeuvring area several press axes correlated one to the other and to actuate them selectively/sequentially.

SUMMARY OF THE INVENTION

The object of the invention is that of eliminating the disadvantages of the prior art described above.

More particularly an object of the invention is that of providing a multi-axis manoeuvring integrated in the touch screen panel of injection presses of plastic materials.

Another object of the invention is that of providing such a touch screen panel which allows the operator to have a direct vision of several axes movements which can be performed and to perform manoeuvring thereof in a simple and intuitive manner.

Yet another object of the invention is that of providing such a touch screen panel with integrated multi-axis movement which does not require substantial structural changes with respect to traditional touch screen panels and which therefore is simple and economical to make.

These objects are achieved by the touch screen panel according to the invention which has the features of the appended independent claim 1.

Advantageous embodiments of the invention are disclosed in the dependent claims.

Substantially, the touch screen operator control panel for industrial machines, in particular for the control of manoeuvring of the axes of injection presses for plastic materials, comprises an operator interface on which icons are displayed, indicating the various axes of a press, individually selectable in order to be dragged into a manoeuvring area, where they are translatable in the two ways of a certain direction to impart corresponding movements to the selected axis, wherein the possibility is provided of simultaneously displaying in said manoeuvring area (2) icons of several press axes correlated one to the other and of actuating sequentially/selectively the movements of these press axes by dragging a central zone (1) of said manoeuvring area (2) in the corresponding different directions wherein the respective icons of the press axes are displayed.

Further features of the invention will be made clearer by the following detailed description, referred to one of its embodiments purely by way of a non-limiting example, illustrated in the accompanying drawings, in which:

DETAILED DESCRIPTION OF THE PREFERRED EMBODIMENTS

Figure 1:
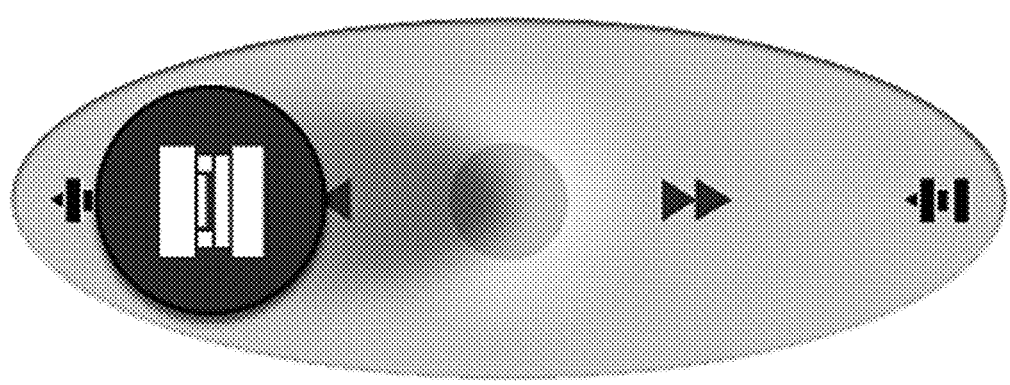
FIG. 1 is a schematic view of a part of the operator interface of a touch screen panel for the control of an injection press for plastic materials, showing an example of manoeuvring on the mould axis alone, according to the prior art.
Figure 2:
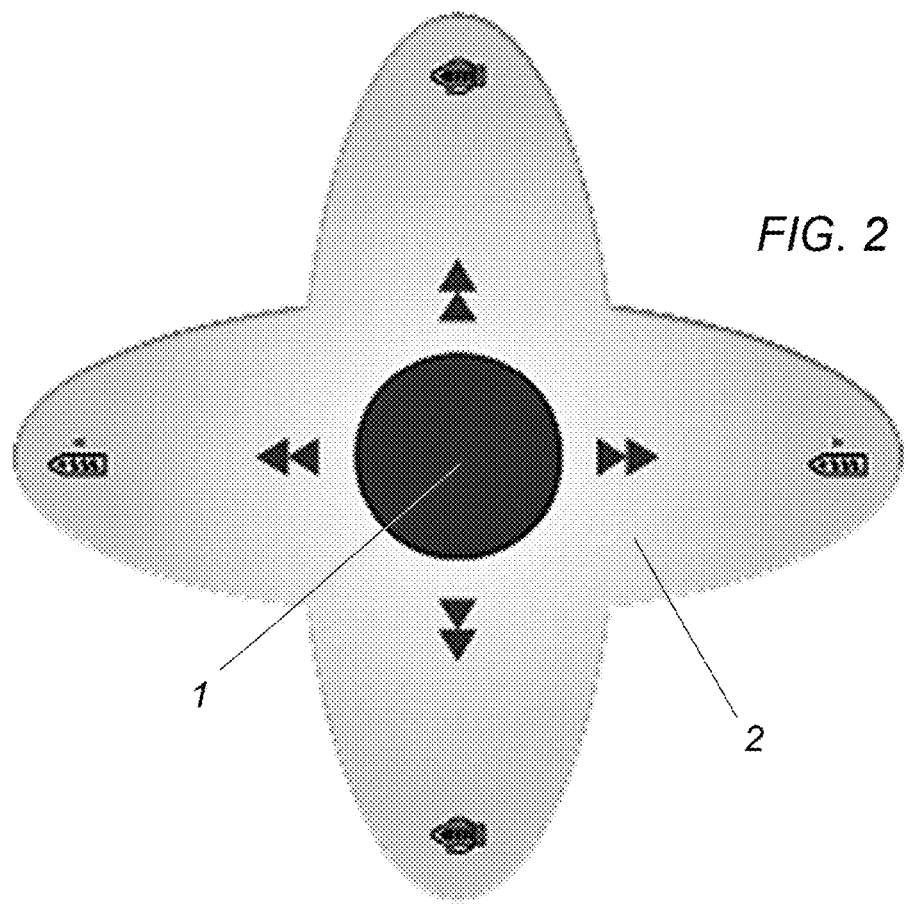
FIG. 2 is a schematic view like that of FIG. 1 showing the simultaneous display of two orthogonal axes movements on the touch screen interface according to the invention.

Referring to FIG. 2, the solution proposed by the invention, with respect to existing ones, allows the simultaneous display of more than one axis movement (two in this case) in the press control and the manoeuvring on several axes accessible by the touch screen interface of the injection press.

Through this solution the press operator will have a direct view of several axis movements which can be performed and will be able to perform the manoeuvring by dragging the finger positioned on a central circle 1 of the manoeuvring area 2 determined for example by the intersection of two ellipses, in the direction of the movement to be performed, with consequent simplification in the use of the machine.

Starting from the central circle 1, the axis to be moved will be able to be chosen, dragging the finger in the horizontal or vertical direction. The movement of the axis will be performed by the displacement in the direction chosen.

During execution of the movement the icon of the movement underway will be displayed in the circle 1.

The method of manoeuvring is not tied to just the two horizontal and vertical axes but can be actuated at a number of axes higher than 2, in which case displacements can for example be provided at 45° with respect to those illustrated in FIG. 2.

Figure 3:
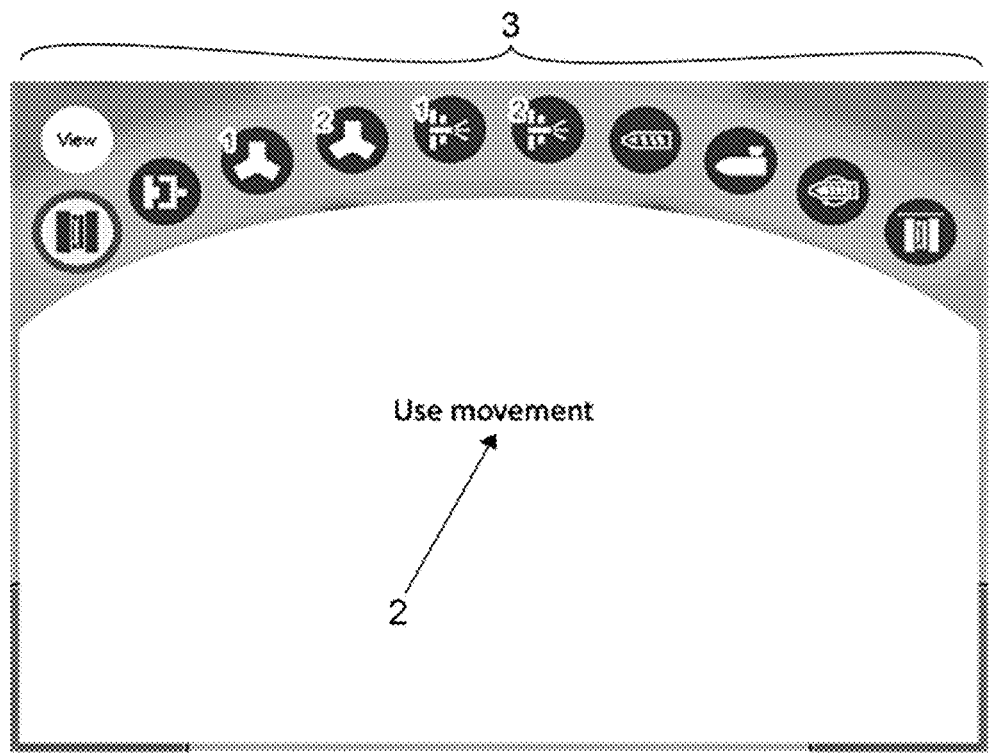
FIG. 3 is a view of the operator interface of a touch screen panel according to the invention, with the "mould" icon selected for the subsequent movements highlighted with a circle.

FIG. 3 shows schematically a series of icons 3 indicating the axis to be moved which can be selected through the dragging in the appropriate area 2 (use movement) for actuating the movement. This mechanism allows a direct and fast choice of the movement.

Figure 4:
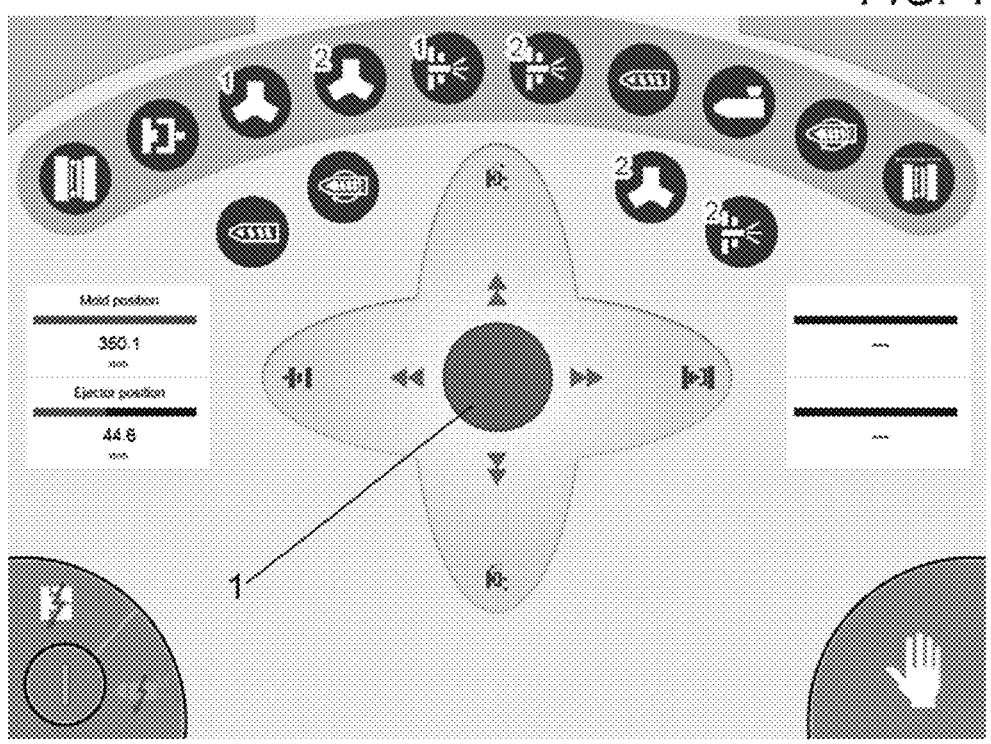
FIG. 4 shows the interface of FIG. 3 with the mould icon dragged to the centre of the area of manoeuvring shown in FIG. 2.

Since the mould axis is normally correlated to the extractor, following the dragging of the mould axis, in the central circle 1 of the manoeuvring area 2, the mould and extractor axes will be displayed (FIG. 4).

Starting therefore from the central circle 1, the axis to be moved can be chosen. Dragging the finger in the horizontal or vertical direction, the movement of the axis will be performed with consequent manoeuvring. During execution of the movement the icon of the movement underway will be displayed in the circle 1.

Figure 5:
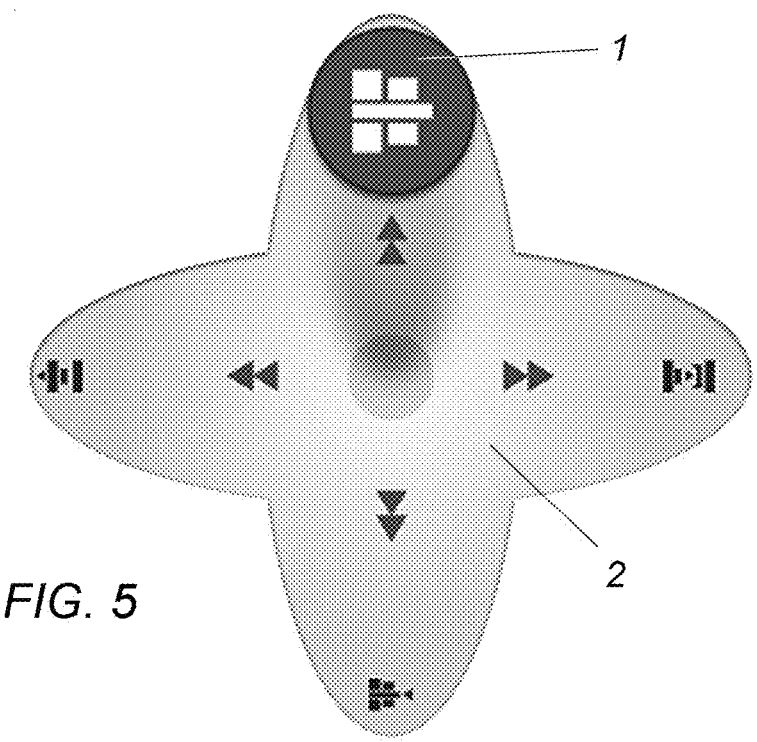
FIGS. 5 and 6 show respectively two examples of manoeuvring of the extractor axis and of the mould axis.
Figure 6:
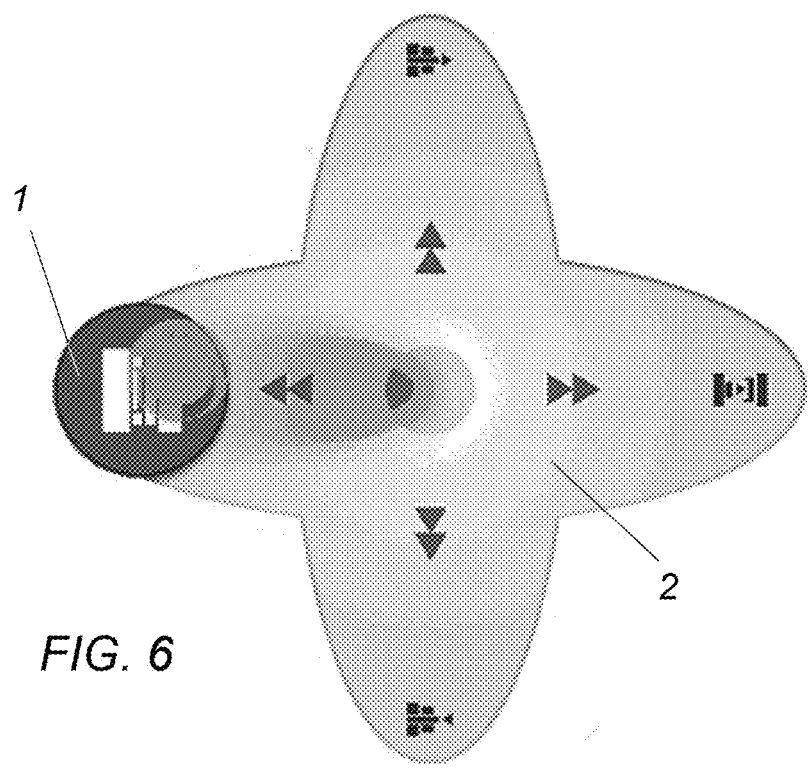

The accompanying FIG. 5 shows an example of manoeuvring of the extractor axis in the vertical direction, while FIG. 6 shows an example of manoeuvring of the mould axis in the horizontal direction.

Figure 7:
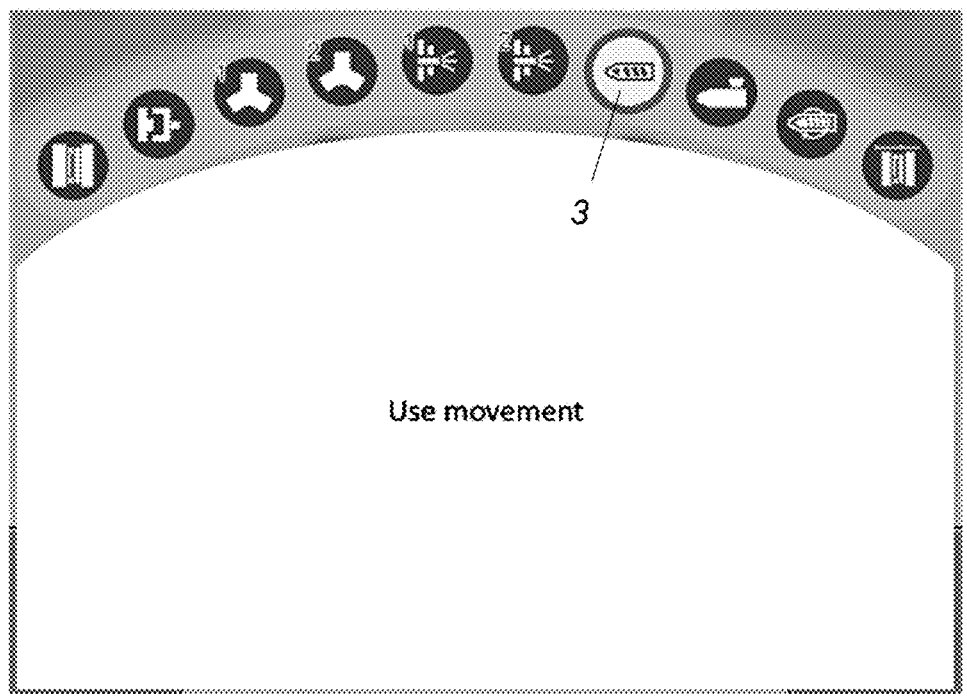
FIG. 7 is a view of the touch screen interface like that of FIG. 3, with the plasticisation screw highlighted.
Figure 8:
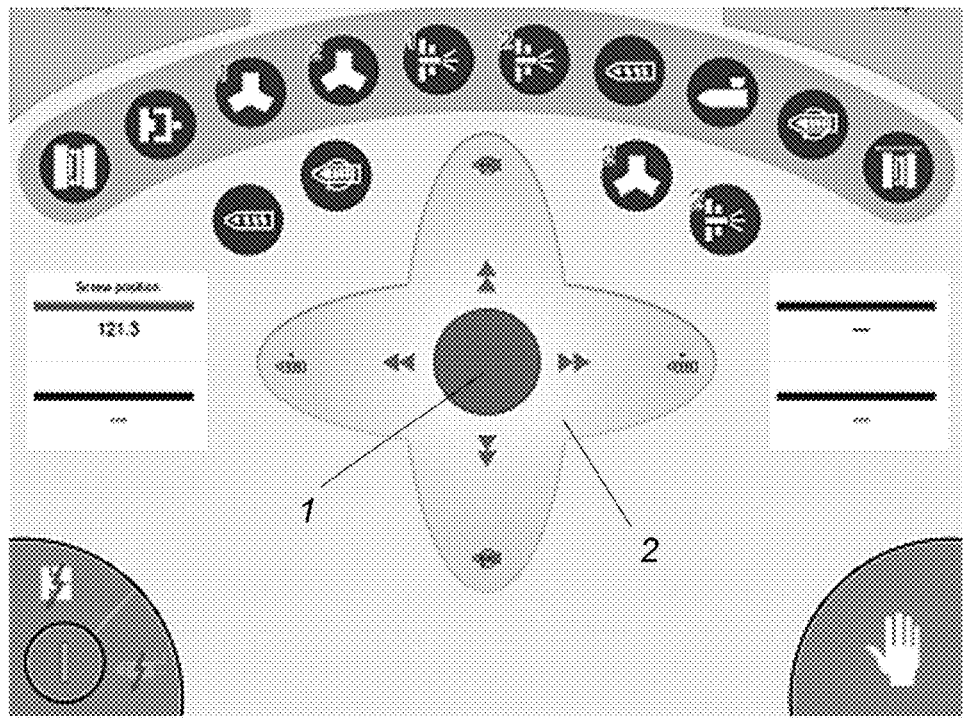
FIG. 8 is a view of the interface showing the icon of the screw brought to the centre of the manoeuvring area.

FIG. 7 shows the operator interface of the touch screen panel with the "screw" axis highlighted with a circle, and FIG. 8 shows this icon dragged into the central circle 1 of the area of manoeuvring 2, where the axes of injection and screw rotation will be displayed, which are normally correlated one to the other.

In the example shown in FIG. 8 the dragging with the finger of the circle 1 in the horizontal direction corresponds to a manoeuvring of the injection axis, while a dragging in the vertical direction corresponds to a rotation of the screw.

Attribution of associations: horizontal axis with one movement and vertical axis with a second movement will be defined dynamically by the software application of the machine, favouring for the horizontal axes the main movements of the injection press such as the movement of the mould and of the plasticisation screw.

Finally, actuation is provided of the regulation of the speed of each movement on the basis of the position achieved with reference to the centre of the manoeuvring area 2. In practice, the extent of the displacement of the circle 1 corresponds to the speed of actuation of the relevant manoeuvring. This allows, in addition to the direction and sequence of the movement, also the regulation of the speed of movement proportionally to the distance covered with the finger from the centre of the manoeuvring area 2 of the touch screen panel.

Figure 9:
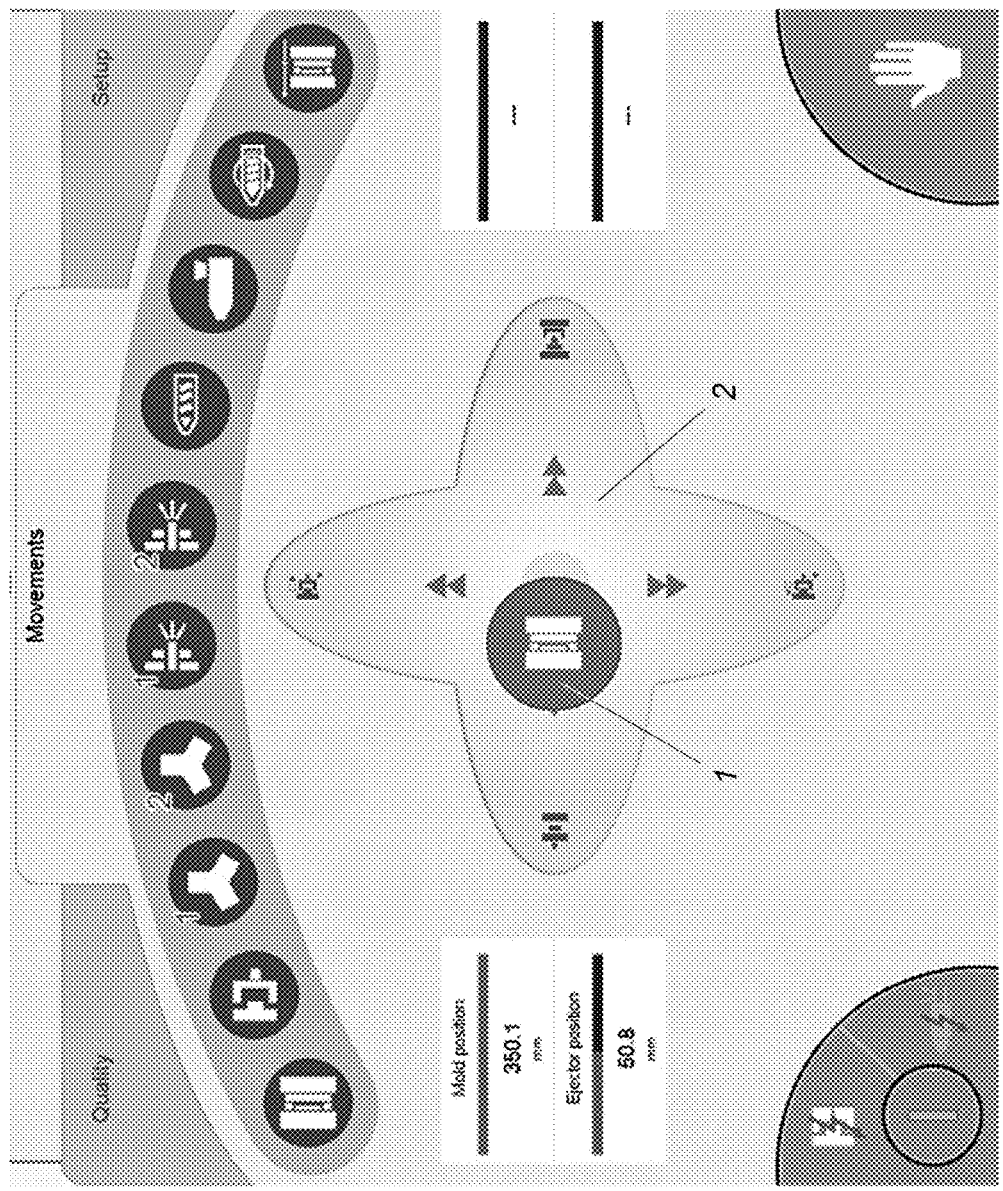
FIG. 9 is a view of the interface of the touch screen panel of the invention schematising the speed of movement proportional to the distance of displacement of the corresponding icon.

FIG. 9 shows schematically the displacement of the mould icon corresponding to a certain speed of manoeuvring of the mould axis.

The writing in FIGS. 4, 8 and 9 indicates by way of an example the positions of the members involved.

From what is disclosed the advantages appear clear of the touch screen panel with integrated multi-axis manoeuvring of an injection press for plastic materials according to the invention, which makes the task of the operator in the control of the machine considerably easier.

Naturally the invention is not limited to the particular embodiment described previously and illustrated in the accompanying drawings, but numerous detail changes may be made thereto, within the reach of the person skilled in the art, without thereby departing from the scope of the same invention, as defined by the appended claims.

The invention claimed is:

1. A touch screen operator control panel for controlling one or more movements of an injection press, comprising:
   a touch-sensitive display screen that registers a touch upon a user-facing surface of the touch-sensitive display screen, the touch-sensitive display screen in communication with the injection press to control the one or more movements of the injection press via a software application of the injection press,
   the touch-sensitive display screen configured to present to a user, on a display of the touch-sensitive display screen, an operator interface that includes a maneuvering area and an area for displaying icons, each one of said icons indicating a movement axis by which the injection press moves in an operation,
   wherein each one of said icons is individually selectable by a user operation of the user to be dragged into the maneuvering area, whereupon the touch-sensitive display screen displays in the maneuvering area a user-controllable control interface for control of a movement axis corresponding to an icon selected and dragged by the user, a touch movement by the user upon said user-controllable control interface being translatable via the software application to impart a corresponding movement to a corresponding movement axis of the injection press, and
   wherein at least one of said icons corresponds to a plurality of correlated press axes of the injection press, and the user-controllable control interface displayed in the maneuvering area by dragging said at least one of said icons into the maneuvering area is a multi-axis control interface with a plurality of control interfaces corresponding to said plurality of correlated press axes, where a first control interface of said plurality of control interfaces overlaps a second control interface of said plurality of control interfaces and a touch operation by the user upon said multi-axis control interface by the user dragging a central zone of said maneuvering area in directions indicated by said multi-axis control interface imparts via the software application corresponding movements to the plurality of correlated press axes of the injection press, wherein said plurality of control interfaces have respective icons of each of the plurality of correlated press axes displayed therein.

2. The touch screen operator control panel according to claim 1, wherein in the case of the multi-axis control interface having two correlated press axes, a first direction of movement of said central zone for said multi-axis control interface is orthogonal to a second direction of movement of said central zone.

3. The touch screen operator control panel according to claim 2, wherein said first directions of movement is horizontal and said second direction of movement is vertical.

4. The touch screen operator control panel according to claim 1, wherein movement of said central zone in the area of maneuvering is proportional to a movement velocity of a corresponding press axis.

5. The touch screen operator control panel according to claim 2, wherein the operator interface controls maneuvering of the two correlated press axes, the two correlated press axes being a mould axis and an extractor axis.

6. The touch screen operator control panel according to claim 2, wherein the operator interface controls maneuvering of the two correlated press axes, the two correlated press axes being a screw axis and a screw rotation axis.

* * * * *